Patented June 2, 1953

2,640,833

UNITED STATES PATENT OFFICE 2,640,833

ORGANOSILICON COMPOSITION

Philip A. Di Giorgio, Schenectady, N. Y., now by change of name Philip D. George, assignor to General Electric Company, a corporation of New York No Drawing. Application June 25, 1949, Serial No. 101,484

4 Claims. (Cl. 260—329)

This invention is concerned with organosilicon compositions. More particularly, the invention relates to hydrolyzable organosilanes containing a silicon-bonded thienyl radical

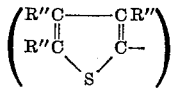

and corresponding to the general formula

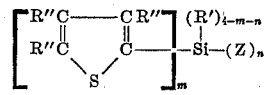

where R″ is the same or different and is a member selected from the class consisting of hydrogen, halogens, and monovalent hydrocarbon radicals, Z is a silicon-bonded hydrolyzable member selected from the class consisting of halogens, and alkoxy radicals of the formula OR where R is a monovalent, saturated hydrocarbon radical, R′ is a monovalent hydrocarbon radical, and $m$ and $n$ are each integers equal to from 1 to 2, inclusive, the sum of $m$ and $n$ being equal to at most 3. Preferably, R″ is a hydrogen atom so that the general formula will correspond to

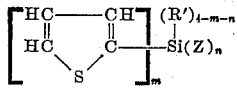

where R′, Z, $m$, and $n$ have the meanings given above.

The hydrolyzable thienyl-substituted silanes described above in the foregoing formulas may be employed for rendering materials water-repellent which were originally water-non-repellent and may also be used as intermediates in the preparation of thienyl-substituted polysiloxanes.

Examples of Z, when the latter is a halogen, include, for instance, chlorine, bromine, fluorine, etc. When Z is an alkoxy radical of the formula OR, R may be the methyl, ethyl, propyl, isopropyl, butyl, isobutyl, amyl, octyl, 2-ethylhexyl, decyl, etc., radicals.

R′ and R″ (the latter in addition to being a hydrogen atom or a halogen atom, as, for instance, chlorine, bromine, etc.) may be, for example, an alkyl radical (e. g., methyl, ethyl, propyl, isopropyl, butyl, amyl, 2-ethylhexyl, dodecyl, etc., radicals); an aryl radical (e. g., phenyl, diphenyl, naphthyl, anthracyl, etc., radicals); aralkyl radicals (e. g., benzyl, phenylethyl, etc., radicals); alkaryl radicals (e. g., tolyl, xylyl, ethylphenyl, etc., radicals); cycloaliphatic radicals (e. g., cyclohexyl, cyclohexenyl, cyclopentyl, cyclopentenyl, cyclopentadienyl, etc., radicals); unsaturated aliphatic radicals (e. g., vinyl, allyl, methallyl, ethinyl, butadienyl, etc., radicals), etc.

In the discussion below directed to making the claimed silanes, illustration will be confined to the thienyl derivatives containing a 2-thienyl radical

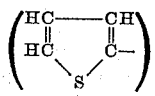

However, I do not intend to be limited to this since as will be apparent to those skilled in the art, other substituted thienyl derivatives are also included within the scope of my claimed invention.

The hydrolyzable thienyl-substituted silanes containing a silicon bonded halogen and corresponding to the above-identified general formula may be prepared, for instance, by effecting reaction between a thienyl Grignard and a hydrocarbon-substituted halogenosilane corresponding to the formula $(R')_q Si(X)_{4-q}$ where R′ has the meaning given above, X is a halogen (e. g., chlorine, bromine, fluorine, etc.), and $q$ is an integer equal to from 1 to 2, inclusive.

If desired, one may effect reaction between a hydrocarbon-substituted magnesium Grignard of the formula R′MgX and a thienylhalogenosilane of the type more particularly disclosed and claimed in my copending application Serial No. 101,483, filed concurrently herewith and assigned to the same assignee as the present invention, where R′ has the meaning disclosed above and X is a halogen, preferably bromine. In carrying out all the foregoing Grignard reactions, it will, of course, be apparent to those skilled in the art that the usual Grignard technique should be employed as, for instance, anhydrous conditions, etc.

In preparing the thienyl- and hydrocarbon-substituted alkoxy silanes, one may react, for example, a thienyl Grignard, for instance, 2-thienylmagnesiumbromide with a hydrocarbon-substituted alkoxy silane corresponding to the general formula $(R')_r Si(OR)_{4-r}$ where R′ and R have the meanings given above and $r$ is an integer equal to from 1 to 2, inclusive. In the preparation of such derivatives where R is the ethyl radical, it will be apparent that the alkoxy silanes prepared by the foregoing method will contain the alkoxy radical corresponding to the formula $C_2H_5O-$. By varying the molar ratio of the thienyl metallic compound (thienyl lithium halides may also be employed) and the hydrocarbon-substituted alkoxy silane, it is possible to obtain various thienyl alkoxy silanes containing monovalent hydrocarbon radicals also attached to the silicon atom by carbon-silicon bonds, the said derivatives being embraced by the above-identified general formula.

It will, of course, be apparent that the thienyl alkoxy silanes corresponding to the general formula described above may be prepared by effecting reaction between a thienyl- and hydrocarbon-substituted halogenosilane with an alcohol corresponding to the formula ROH where R is a monovalent, saturated, aliphatic radical, many examples of which have been given previously. Thus, thienyl methyldiethoxysilane or thienyl phenyldiethoxysilane may be prepared by effecting reaction at room temperature between ethyl alcohol and thienyl methyldichlorosilane and thienyl phenyldichlorosilane, respectively.

In order that those skilled in the art may better understand how the present invention may be practiced, the following examples are given by way of illustration and not by way of limitation. All parts are by weight.

*Example 1*

Methyl 2-thienyldichlorosilane was prepared by effecting reaction under substantially anhydrous conditions at normal temperatures between 150 grams (1.0 mol) methyltrichlorosilane and an ether solution containing 224 grams (1.2 mols) of 2-thienylmagnesiumbromide by adding the latter to an ether solution of the former in a three-necked flask equipped with stirrer, reflux condenser and dropping funnel. The addition took about one hour and was accompanied by spontaneous refluxing and deposition of solid matter. After the addition was completed, the reaction mixture was heated at reflux with stirring for about three hours. The precipitated magnesium salts were separated from the reaction mixture and the filtrate fractionally distilled to give 187 grams crude product. Of this latter material approximately 93.5 grams (0.48 mol), 48 per cent yield, was isolated and identified as methyl 2-thienyldichlorosilane $$[CH_3(2\text{-}C_4H_3S)SiCl_2]$$

This material boiled at 199–200° C. at atmospheric pressure and contained 35.2 per cent hydrolyzable chlorine (theoretical 36.0 per cent).

Further fractional distillation yielded about 10 grams (0.04 mol), 4 per cent yield, of methyl di-(2-thienyl) chlorosilane boiling at 301–307° C. at atmospheric pressure and containing 13.6 per cent hydrolyzable chlorine (theoretical 14.5 per cent hydrolyzable chlorine).

*Example 2*

Using substantially the same conditions as employed in Example 1, methyl di-(2-thienyl) chlorosilane was also prepared by effecting reaction between an ether solution containing 636 grams (3.4 mols), 2-thienylmagnesiumbromide, and 247 grams (1.65 mols) methyltrichlorosilane. Filtration and fractional distillation of the reaction product yielded 107 grams (0.44 mol), 27 per cent yield, methyl di-(2-thienyl) chlorosilane boiling at 138–148° C. at 3 mm., and containing approximately the same per cent hydrolyzable chlorine as disclosed in Example 1.

*Example 3*

Employing the same conditions as used in Example 1, dimethyl 2-thienylchlorosilane was prepared by effecting reaction between 374 grams (2.0 mols) of 2-thienylmagnesiumbromide with 284 grams (2.2 mols) dimethyldichlorosilane. In this manner there was obtained 128 grams (0.73 mol), 33 per cent yield, of dimethyl 2-thienylchlorosilane boiling at 98° C. at 40 mm. and containing 19.9 per cent hydrolyzable chlorine (theoretical 20.1 per cent hydrolyzable chlorine).

*Example 4*

Phenyl 2-thienyldichlorosilane was prepared in the following manner using the same conditions as employed in Example 1. More particularly, 224 grams (1.2 mols) 2-thienylmagnesiumbromide was reacted with 212 grams (1.0 mol) phenyltrichlorosilane to yield 167 grams (0.63 mol), 56 per cent yield, of phenyl 2-thienyldichlorosilane boiling at 144–160° C. at 2–3 mm. and containing 25.8 per cent hydrolyzable chlorine (theoretical 27.4 per cent hydrolyzable chlorine).

It is desired to point out that many of the per cent hydrolyzable chlorine values found for the thienyl-substituted silanes prepared by the Grignard reaction using the bromide are slightly lower than the theoretical values. This is due in some measure to the presence of bromosilanes arising from halogen interchange.

*Example 5*

Methyl 2-thienyldiethoxysilane, $$CH_3(2\text{-}C_4H_3S)Si(OC_2H_5)_2$$

and phenyl 2-thienyldiethoxysilane, $$C_6H_5(2\text{-}C_4H_3S)Si(OC_2H_5)_2$$

may be prepared by effecting reaction at a temperature of from 25° to 100° C. in a solvent, e. g., benzene, between ethyl alcohol and methyl 2-thienyldichlorosilane, $CH_3(2\text{-}C_4H_3S)SiCl_2$, and phenyl 2-thienyldichlorosilane, $$C_6H_5(2\text{-}C_4H_3S)SiCl_2$$

respectively, using the chlorosilanes obtained in Examples 1 and 4.

*Example 6*

Methyl di-(2-thienyl) chlorosilane, $$CH_3(2\text{-}C_4H_3S)_2SiCl$$

may be caused to react in a benzene solvent on an equal molar basis with ethyl alcohol to give methyl di-(2-thienyl) ethoxysilane, $$CH_3(2\text{-}C_4H_3S)_2SiOC_2H_5$$

using the halogenosilane obtained in Example 2 as one of the reactants.

*Example 7*

Employing the usual procedures known in the art for making alkoxysilanes, dimethyl 2-thienylethoxysilane $(CH_3)_2(2\text{-}C_4H_3S)SiOC_2H_5$ may be prepared by effecting reaction in a benzene solvent at a temperature of from 25° to 100° C. between the chlorosilane prepared in Example 3, dimethyl 2-thienylchlorosilane, $$(CH_3)_2(2\text{-}C_4H_3S)SiCl$$

and ethyl alcohol on an equal molar basis to give diethyl (2-thienyl) ethoxysilane.

It will, of course, be apparent to those skilled in the art that many other hydrolyzable thienyl hydrocarbon-substituted silanes corresponding to the general formula in column 1 may also be prepared using the methods disclosed in the foregoing examples and in the general description found earlier. Among such hydrolyzable silanes, in addition to the ones disclosed in the foregoing examples, may be mentioned ethyl 2-thienyldichlorosilane, ethyl 2-thienyldibromosilane, dipropyl 2-thienylchlorosilane, diamyl 2-thienylchlorosilane, didecyl 2-thienylbromosilane, phenyl 2-thienyldibromosilane, chlorophenyl 2-thienyldichlorosilane, phenyl 2-(chlorothienyl) dichlorosilane, diphenyl 2-thienylchlorosilane, naphthyl di-(2-thienyl) chlorosilane, phenyl di-(2-thienyl) chlorosilane, benzyl 2-thienyldichlorosilane, tolyl 2-thienyldichlorosilane, cyclohexyl di-(2-thienyl) bromosilane, vinyl 2-thienyldichlorosilane, allyl 2-thienyldichlorosilane, cyclohexenyl di-(2-thienyl) bromosilane, methyl 2-(methylthienyl) dibromosilane [CH$_3$(2-C$_4$H$_2$SCH$_3$)SiBr$_2$], etc.; ethyl 2-thienyldiethoxysilane, ethyl 2-thienyldibutoxysilane, dipropyl 2-thienylpropoxysilane, diamyl 2-thienylethoxysilane, didecyl 2-thienylbutoxysilane, phenyl 2-thienyldibutoxysilane, diphenyl 2-thienylhexoxysilane, naphthyl di-(2-thienyl) ethoxysilane, phenyl di-(2-thienyl) ethoxysilane, benzyl 2-thienyldiethoxysilane, tolyl 2-thienyldiethoxysilane, cyclohexyl di-(2-thienyl) butoxysilane, vinyl 2-thienyldiisobytoxysilane, allyl 2-thienyldiethoxysilane, cyclohexenyl di-(2-thienyl) butoxysilane, etc.

It will, of course, be apparent that I do not intend to be limited to the hydrolyzable thienyl-substituted silanes described above since I may prepare other hydrolyzable thienyl-substituted silanes containing various other hydrocarbon radicals attached to the silicon atom by the carbon-silicon linkage and various other monovalent hydrocarbon radicals and halogens attached to the thienyl nucleus and containing other silicon-bonded hydrolyzable groups including other halogens and alkoxy radicals, many examples of which have been given previously in the discussion of the general formula embracing the claimed compositions of matter.

What I claim as new and desire to secure by Letters Patent of the United States is:

1. A hydrolyzable organosilane corresponding to the general formula

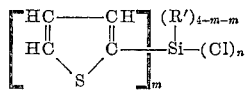

where R' is a monovalent hydrocarbon radical selected from the class consisting of methyl, ethyl, and phenyl radicals, and $m$ and $n$ are each integers equal to from 1 to 2, inclusive, the sum of $m$ and $n$ being equal to, at most, 3.

2. Methyl 2-thienyldichlorosilane.
3. Phenyl 2-thienyldichlorosilane.
4. Methyl di-(2-thienyl) chlorosilane.

PHILIP A. DI GIORGIO.

References Cited in the file of this patent

UNITED STATES PATENTS

| Number | Name | Date |
|---|---|---|
| 2,238,669 | Wiley | Apr. 15, 1941 |
| 2,381,138 | Patnode | Aug. 7, 1945 |
| 2,460,457 | Hyde | Feb. 1, 1949 |
| 2,468,162 | Hyde | Oct. 25, 1949 |

OTHER REFERENCES

Krause et al.: Berichte Deut. Chem. Gesell, vol. 62, 1929 pp. 1710–1712.

Rochow: "Chemistry of Silicones," Wiley, 1946, pp. 93 and 94.

Post: Silicones and Other Organic Silicon Compounds, pp. 67, 126, 180, 183, Reinhold Pub. Co., N. Y., 1949.

Whitmore: Organic Chemistry, pp. 884, 893, Van Nostrand, N. Y., 1937.

Richter: Organic Chemistry, pp. 649, 650, Wiley, N. Y., 1938.

Powers: Advancing Fronts in Chemistry, vol. II, p. 33, Reinhold Pub. Co., New York, 1946.

Steinkopf: Die Chemie des Thiophens, p. 21, Edwards Lithoprint, 1941.

Steinkopf: Die Chemie des Thiophens, pp. 19 and 1251, Steinkopf, Dresden, 1941.